(12) United States Patent
Im

(10) Patent No.: US 7,227,327 B2
(45) Date of Patent: Jun. 5, 2007

(54) SYSTEM AND METHOD FOR AUTOMATICALLY RETURNING SELF-MOVING ROBOT TO CHARGER

(75) Inventor: Hyoung-deuk Im, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 11/318,491

(22) Filed: Dec. 28, 2005

(65) Prior Publication Data
US 2006/0273749 A1   Dec. 7, 2006

(30) Foreign Application Priority Data
Jun. 7, 2005   (KR)   ...................... 10-2005-0048462

(51) Int. Cl.
*G05D 1/02*   (2006.01)
(52) U.S. Cl. .................. 318/568.12; 700/259; 701/25; 701/28
(58) Field of Classification Search ........... 318/568.12, 318/580, 587; 700/245, 259; 701/23, 25, 701/26, 28
See application file for complete search history.

(56) References Cited

U.S. PATENT DOCUMENTS

| 4,679,152 A | * | 7/1987 | Perdue | ........................ 701/23 |
| 4,777,416 A | * | 10/1988 | George et al. | .......... 318/568.12 |
| 5,220,263 A | * | 6/1993 | Onishi et al. | ................ 318/587 |
| 6,748,297 B2 | * | 6/2004 | Song et al. | .................. 700/259 |
| 6,764,373 B1 | * | 7/2004 | Osawa et al. | ................ 446/175 |
| 6,859,682 B2 | * | 2/2005 | Naka et al. | .................. 700/245 |
| 7,057,368 B2 | * | 6/2006 | Tsurumi | ................ 318/568.12 |

FOREIGN PATENT DOCUMENTS

| KR | 10-2000-0002481 A | 1/2000 |
| KR | 10-2004-0087176 A | 10/2004 |

* cited by examiner

*Primary Examiner*—Bentsu Ro
(74) *Attorney, Agent, or Firm*—Birch, Stewart, Kolasch & Birch, LLP

(57) ABSTRACT

A system and method for automatically returning a self-moving robot to a charger is provided. The charger emits infrared light from an infrared module in response to a charging request signal received from the self-moving robot through a wireless transceiver, and outputs an infrared emission signal according to the infrared light emission. The self-moving robot communicates a variety of data with the charger, outputs the charging request signal to the charger when its battery level is lower than a reference level, and moves back to the charger using image information input from a camera module in response to the infrared emission signal from the charger. The self-moving robot includes a microprocessor for controlling movement of the self-moving robot for returning to the charger, using position information of infrared light in a picture input from the camera module, if the infrared light is detected in the picture input from the camera module.

20 Claims, 2 Drawing Sheets

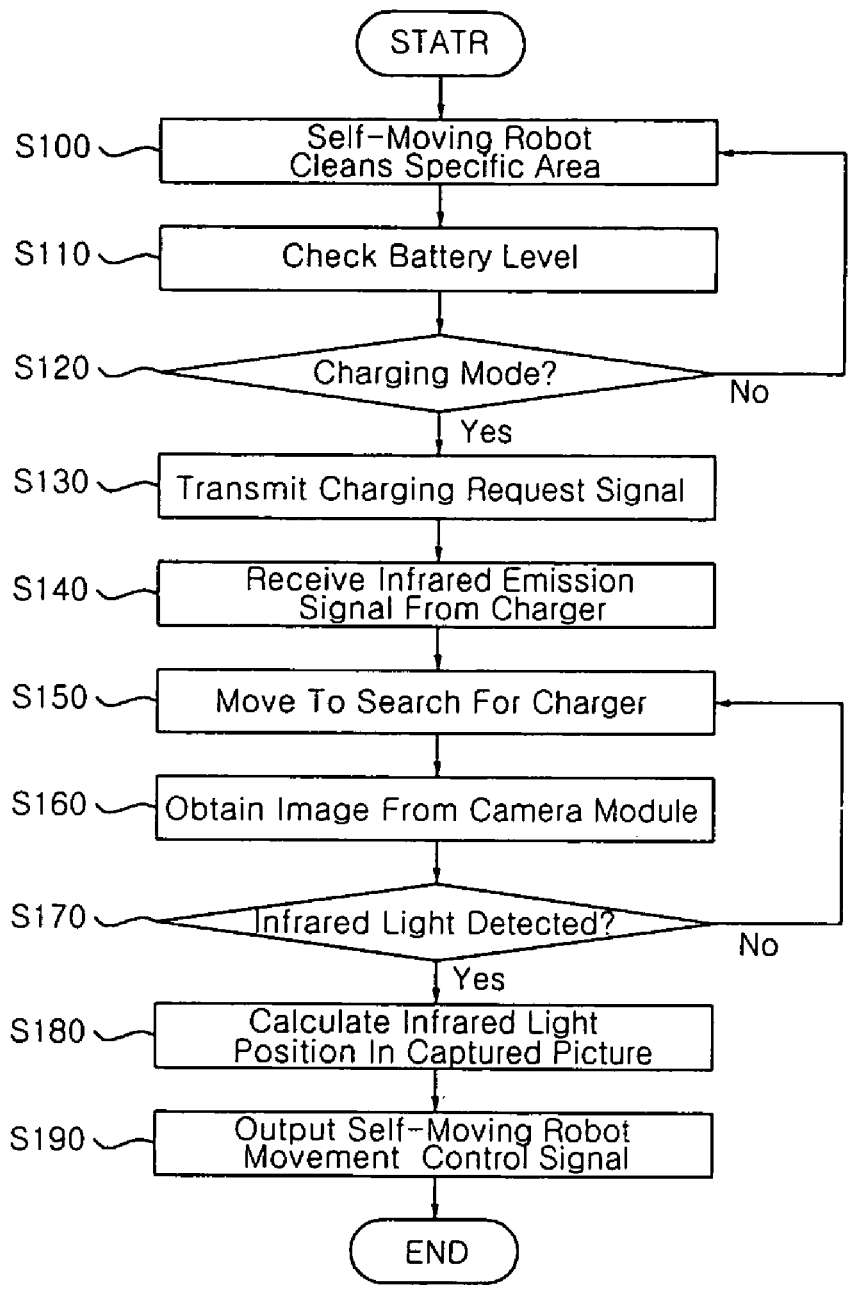

SYSTEM AND METHOD FOR AUTOMATICALLY RETURNING SELF-MOVING ROBOT TO CHARGER

BACKGROUND OF THE INVENTION

1. Field of the Invention

The present invention relates to a self-moving robot, and more particularly to a system and method for automatically returning a self-moving robot to a charger wherein the self-moving robot can quickly and accurately return to the charger through infrared image information of an infrared module provided on the charger, which has been input from a camera module provided on the self-moving robot.

2. Description of the Related Art

Robots have been developed for industrial purposes and used as part of factory automation. Robots also have been used, in place of human beings, to collect information in extreme environments that human beings cannot access. Robot technologies have been rapidly developed as applied to the most advanced space development industries. Recently, even human-friendly household robots have been developed. A typical example of the human-friendly household robot is a self-moving cleaning robot.

The self-moving cleaning robot is a device that sucks up dust or other foreign particles while automatically moving within a specific cleaning area as in a residence or office. In addition to the components of a general vacuum cleaner that sucks up dust or other foreign particles, the self-moving cleaning robot includes a propelling unit for moving the robot, a number of detection sensors for detecting a variety of obstacles so that the robot moves without colliding with obstacles in the cleaning area, a battery for supplying power to each component of the robot, and a microprocessor for controlling each component of the robot.

Using the detection sensors, the cleaning robot determines distances to a variety of obstacles such as furniture and walls in the cleaning area, and cleans the cleaning area while moving without colliding with obstacles using the determined information.

Recently, a self-moving cleaning robot that has a camera module to detect positions of a cleaning area in order to clean the cleaning area without omitting any part thereof has been introduced.

This self-moving robot can not only detect its own position but also obtain accurate information of the cleaning area through surrounding images captured by the camera module, so that it can more accurately clean the cleaning area without omitting any part thereof.

On the other hand, as the self-moving cleaning robot is driven by the battery as described above, it has an automatic battery charging function for user convenience. Through the automatic charging function, the self-moving robot detects its battery level, and, if the battery level is lower than a reference level, the self-moving robot automatically returns to a charger provided at a specific position in the cleaning area and resumes the cleaning operation after the battery is fully charged by the charger.

In the conventional method for automatically returning the self-moving cleaning robot to the charger, the self-moving robot determines the position of the charger by detecting infrared light emitted from an infrared transmitter provided on the charger using an infrared sensor provided on the self-moving robot in order to return to the charger.

However, in the conventional method, it takes a long time for the infrared sensor provided on the self-moving robot to detect infrared light emitted from the infrared transmitter since the infrared sensor not only has a narrower light receiving range but also cannot detect the infrared signal when the self-moving robot is more than a specific distance away from the infrared transmitter. If it takes a long time to detect the infrared light emitted from the infrared transmitter, the battery may be discharged and the self-moving robot may stop on the way back to the charger.

SUMMARY OF THE INVENTION

Therefore, the present invention has been made in view of the above problems, and it is an object of the present invention to provide a system and method for automatically returning a self-moving robot to a charger, wherein the self-moving robot quickly detects the position of the charger based on infrared image information of an infrared module provided on the charger, which has been input from a camera module provided on the self-moving robot, thereby allowing the self-moving robot to more quickly and accurately return to the charger.

In accordance with the present invention, the above and other objects can be accomplished by the provision of a system, comprising a self-moving robot and a charger, for automatically returning the self-moving robot to the charger, wherein the charger emits infrared light from an infrared module in response to a charging request signal received from the self-moving robot through a wireless transceiver, and outputs an infrared emission signal according to the emission of the infrared light, and the self-moving robot communicates a variety of data with the charger, outputs the charging request signal to the charger when a battery voltage of the self-moving robot is lower than a reference voltage, and moves back to the charger using image information input from a camera module, which captures images input from a lens, in response to the infrared emission signal received from the charger, and the self-moving robot also includes a microprocessor for controlling movement of the self-moving robot to return the self-moving robot to the charger, using position information of infrared light in a picture input from the camera module, if the infrared light is detected in the picture input from the camera module.

In the system and method for automatically returning the self-moving robot to the charger according to the present invention, the position of the charger is detected based on infrared light image information input from the camera module provided on the self-moving robot, without using a separately mounted infrared or ultrasonic sensor that has been conventionally used for returning the self-moving robot to the charger. This allows the self-moving robot to more quickly return to the charger.

BRIEF DESCRIPTION OF THE DRAWINGS

The above and other objects, features and other advantages of the present invention will be more clearly understood from the following detailed description taken in conjunction with the accompanying drawings, in which:

FIG. 2 is a flow chart of a method for automatically returning a self-moving robot to a charger according to the present invention.

DESCRIPTION OF THE PREFERRED EMBODIMENTS

Figure 1:
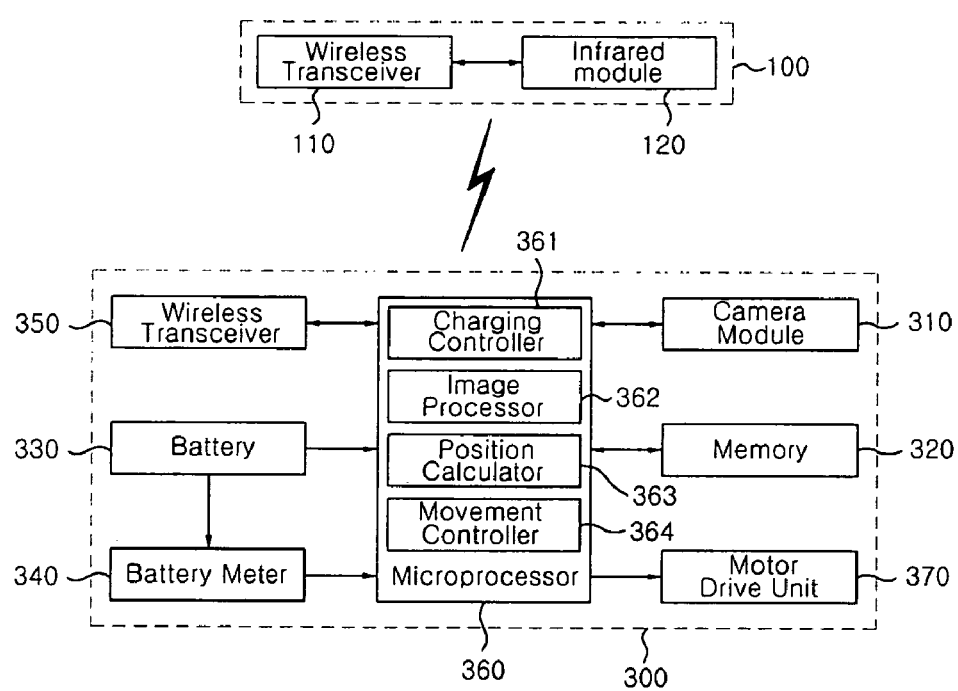
FIG. 1 is a schematic block diagram of a system for automatically returning a self-moving robot to a charger according to the present invention.

Now, preferred embodiments of the present invention will be described in detail with reference to the accompanying drawings so that the present invention will be easily understood and realized by those skilled in the art.

In the following description, a self-moving robot in the present invention is exemplified by a cleaning robot. However, without being limited to the cleaning robot, the self-moving robot in the present invention includes any robot that automatically returns to a charger when its battery is nearly exhausted and that is activated after the battery is fully charged.

FIG. 1 is a schematic block diagram of a system for automatically returning a self-moving robot to a charger according to the present invention.

As shown in FIG. 1, the system for automatically returning the self-moving robot to the charger according to the present invention primarily includes a charger 100 and a self-moving robot 300. The charger 100 induces the self-moving robot 300 to return to the charger 100 when it is necessary to charge the self-moving robot 300 and supplies power to the self-moving robot 300 when it has returned to the charger 100. The self-moving robot 300 performs a cleaning operation according to a command from the user while moving within a specific area using surrounding image information input from a camera module.

The charger 100 of the automatic robot returning system according to the present invention transmits and receives data to and from the self-moving robot 300 and induces the self-moving robot to return to the charger 100. As shown in FIG. 1, the charger 100 includes a wireless transceiver 110 for wirelessly transmitting and receiving data to and from the self-moving robot 300 and an infrared module 120 for emitting infrared light. Although not shown in the drawing, the charger 100 also includes a power supply terminal through which power is supplied to the self-moving robot 300 when the self-moving robot 300 has docked with the charger 100.

In this embodiment, the wireless transceiver 110 transmits and receives a wireless signal through one of a Bluetooth module, a wireless LAN module, and a Zigbee module which are wireless local area communication modules. In another embodiment, the wireless transceiver 110 can be implemented according to an infrared communication scheme using infrared signals. In this case, the charger 100 performs data communication with the self-moving robot 300 through the infrared module 120 that includes an infrared transmitter for modulating a given signal into infrared light and emitting the infrared light and an infrared receiver for demodulating received infrared light.

The infrared module 120 drives a light emitting element to emit infrared light in response to a charging request signal that is received from the self-moving robot 300 through the wireless transceiver 110. When the infrared module 120 emits infrared light through the light emitting element, the charger 100 transmits an infrared emission signal, indicating the operating status of the light emitting element, to the self-moving robot 300 through the wireless transceiver 110.

In other words, in the embodiment of the present invention, upon receiving a charging request signal through the wireless transceiver 110, the charger 100 configured as described above activates the infrared module 120 to emit infrared light to induce the self-moving robot 300 to return to the charger 100 and also transmits an infrared emission signal, indicating the infrared emission status, to the self-moving robot 300 through the wireless transceiver 110.

A description will now be given of the self-moving robot which is a component of the system for automatically returning the self-moving robot to the charger according to the present invention and the movement of which is controlled according to the operating status of the charger configured as described above.

The self-moving robot 300 according to the embodiment of the present invention includes a camera module 310, a memory 320, a battery 330, a battery meter 340, a wireless transceiver 350, a microprocessor 360, and a motor drive unit 370. The camera module 310 captures an image received through a lens. The memory 320 stores an operating program for operation of the self-moving robot 300 and image information input from the camera module 310. The battery 330 supplies power to each component of the self-moving robot 300. The battery meter 340 measures the voltage level of the battery 330. The wireless transceiver 350 transmits and receives data to and from the charger 100. The microprocessor 360 controls each component of the self-moving robot 300.

The camera module 310 captures a variety of images ahead as the self-moving robot 300 moves. Although not shown in the drawing, the camera module 310 includes a lens system, an imaging unit, a conversion unit, and a camera module controller. The imaging unit converts an optical signal from the lens system into an analog electrical signal. The conversion unit processes and converts the signal output from the imaging unit into a digital signal having a format suitable for input to the microprocessor 360. The camera module controller controls the overall operation of the camera module. The camera module having these components is known in the art and thus a detailed description thereof is omitted herein.

As the self-moving robot 300 according to the present invention moves, the self-moving robot captures surrounding images through the camera module 310. Using the captured image information, the self-moving robot 300 can more accurately determine whether or not obstacles are present. The camera module 310 is mounted on a front portion of the self-moving robot 300, preferably at the same height as the light emitting element of the infrared module 120 that is provided on the charger 100 described above.

As described above, in the system for automatically returning the self-moving robot to the charger according to the present invention, the self-moving robot 300 moves while capturing surrounding images through the camera module 310, and, using the captured image information, the self-moving robot 300 not only can more accurately determine whether or not obstacles are present when it is in motion but also can return to the charger 100 by detecting the direction of infrared light emitted from the infrared module 120.

The memory 320, which is composed of a non-volatile memory such as an EEPROM or a flash memory, stores an operating program for operation of the self-moving robot. The memory 320 also stores minimum battery information necessary for performing cleaning, for example, a reference voltage level of the battery. The memory 320 also stores a variety of information of images captured by the camera module 310. The microprocessor 360 controls access to such data stored in the memory 320.

The battery meter 340 measures the voltage of the battery 330 embedded in the self-moving robot 300. Specifically, the battery meter 340 divides a voltage output from the battery 330 by a specific resistance ratio and measures and outputs the divided voltage to the microprocessor 360.

The microprocessor 360 displays the current battery level on a battery level indicator bar according to the measured voltage level received from the battery meter 340.

The wireless transceiver 350 performs data communication with the wireless transceiver 110 of the charger 100. In an embodiment of the present invention, the wireless transceiver 350 transmits and receives a wireless signal through one of a Bluetooth module, a wireless LAN module, and a Zigbee module which are wireless local area communication modules.

In another embodiment, the wireless transceiver 350 can be implemented according to an infrared communication scheme using infrared signals. In this embodiment, as described above, the charger 100 performs data communication with the self-moving robot 300 through the infrared module 120 that includes an infrared transmitter for modulating a given signal into infrared light and emitting the infrared light and an infrared receiver for demodulating received infrared light, and the self-moving robot 300 transmits and receives a variety of data through an infrared communication module corresponding to the infrared module 120 of the charger 100. Specifically, the infrared communication module of the self-moving robot 300 includes an infrared transmitter for modulating a given signal into infrared light and emitting the infrared light and an infrared receiver for demodulating received infrared light. Such infrared communication is known in the art and thus a detailed description thereof is omitted herein.

The motor drive unit 370 drives left and right wheel motors coupled to left and right wheels according to motor drive signals (i.e., movement control signals) received from the microprocessor 360.

The microprocessor 360 of the self-moving robot 300 according to the embodiment of the present invention controls the overall operation of the self-moving robot 300 based on the operating program data stored in the memory 320. According to an aspect of the present invention, the microprocessor 360 controls movement of the self-moving robot 300 to return to the charger 100 with reference to infrared light position information obtained from image information input through the camera module 310.

Specifically, the microprocessor 360 according to the present invention includes a charging controller 361, an image processor 362, a position calculator 363, and a movement controller 364 as shown in FIG. 1.

When a self-moving robot battery voltage received from the battery meter 340 is lower than a reference voltage, the charging controller 361 outputs a charging request signal, requesting that the charger 100 charge the battery, to the wireless transceiver 350. When receiving an infrared emission signal through the wireless transceiver 350 in response to the charging request signal, the charging controller 361 controls the motor drive unit 370 so that the self-moving robot 300 moves around in surrounding areas to search for infrared light emitted from the charger 100 according to a preset movement algorithm.

As described above, the self-moving robot 300 captures surrounding images while moving around in surrounding areas to search for the infrared light according to a control signal of the charging controller 361.

The image processor 362 stores a picture received from the camera module 310 in the memory 320 and compares image information of the previous picture stored in the memory 320 with image information of a current picture input from the camera module 310 to detect infrared light emitted from the infrared module 120 of the charger 100.

Specifically, in the embodiment of the present invention, the image processor 362 detects infrared light emitted from the infrared module 120 mounted on the charger 100 based on the difference between image information (for example, color or luminance information) of captured pictures input from the camera module 310 according to the operating program data of the self-moving robot 300. More specifically, when the camera module 310 in the embodiment of the present invention captures a picture including an infrared image as described above, the picture changes from the previous picture in color or luminance due to the infrared image, so that the image processor 362 detects the color or luminance change.

The position calculator 363 calculates the position of infrared light in a captured picture when the image processor 362 detects the infrared light in the captured picture. For example, the position calculator 363 calculates the direction from the center of the captured picture to the center of the detected infrared image.

Based on the position information output from the position calculator 363, the microprocessor 360 in the self-moving robot 300 outputs a control signal to the left/right wheel motor drive unit 370 through the movement controller 364 so that the self-moving robot 300 moves according to the control signal.

In the embodiment of the present invention, based on the infrared light position information input from the position calculator 363, the movement controller 364 outputs a movement control signal to allow the position of the infrared light to be located at the center of the captured picture, i.e., at the center of the lens.

Each time the self-moving robot 300 according to the present invention moves a specific distance, the self-moving robot 300 compares image information of a previous picture stored in the memory 320 with image information of a current picture input from the camera module 310, and outputs a movement control signal for the self-moving robot 300 to the motor drive unit 370 through the movement controller 361, based on infrared light position information obtained by the comparison, to allow the position of the infrared light to be located at the center of the picture.

The system for automatically returning the self-moving robot to the charger according to the present invention can easily detect the position of the charger 100 using the infrared light position information obtained from the picture captured by the camera module 310 so that the self-moving robot 300 can more quickly return to the charger 100.

The system according to the present invention utilizes the fact that general camera modules mounted on self-moving robots can detect infrared light. The general camera module can easily detect infrared light emitted from the charger even when the charger is distant since the general camera module has a wide light receiving range (i.e., a wide image capturing range of images input to the camera module through the lens), compared to infrared or ultrasonic sensors which have been conventionally used for automatically returning the self-moving robot to the charger.

As described above, when infrared light is detected in a captured picture input from the camera module, the position of the infrared light in the captured picture is calculated and movement of the self-moving robot is controlled based on the calculated infrared light position, so that the self-moving robot can more quickly return to the charger.

Now, a method for automatically returning a self-moving robot to a charger according to the present invention will be described with reference to FIGS. 1 and 2.

FIG. 2 is a flow chart of the method for automatically returning the self-moving robot to the charger according to the present invention. The self-moving robot 300 according to the present invention performs a cleaning operation within a specific area according to a command from a user as shown in FIGS. 1 and 2 (S100). While performing the cleaning operation, the self-moving robot 300 measures a battery level at specific time intervals through the battery meter 340 (S11).

When the battery level received from the battery meter 340 is lower than a reference level set in the memory 320 (S120), the microprocessor 360 in the self-moving robot 300 switches to a charging mode (i.e., a return mode) for returning the self-moving robot 300 to the charger 100. However, if the battery level received from the battery meter 340 is higher than the reference level set in the memory 320, the microprocessor 360 returns to step S100 to perform the cleaning operation according to the command from the user.

When the battery level received from the battery meter 340 is lower than the reference level set in the memory 320 so that the microprocessor 360 switches to the charging mode, the microprocessor 360 in the self-moving robot 300 outputs a charging request signal to the charger 100 through the charging controller 361 (S130). In response to an infrared emission signal received from the charger 100 through the wireless transceiver 350, the self-moving robot 300 moves within a specific area to search for infrared light according to a movement algorithm stored in the memory 320 in order to search for the charger 100 (S140 and S150). Data communication between the charger 100 and the self-moving robot 300 may be performed using one of a Bluetooth module, a wireless LAN module, and a Zigbee module which are wireless local area communication modules, and may also be performed using infrared light.

When moving to search for the charger 100 according to the infrared emission signal transmitted from the charger 100, the self-moving robot 300 obtains pictures of surrounding areas input through the camera module 310 and stores the obtained pictures in the memory 320 (S160).

The microprocessor 360 then detects infrared light emitted from the infrared module 120 of the charger 100 from a picture input from the camera module 310 (S170). Specifically, in the embodiment of the present invention, the microprocessor 360 of the self-moving robot 300 compares, through the image processor 362, a previous image stored in the memory with image information of a current picture input from the camera module 310 to detect infrared light emitted from the infrared module 120 of the charger 100.

When the camera module 310 captures a picture including any part of an image of the infrared light emitted from the infrared module 120 of the charger 100, color or luminance information (or value) of a previous picture stored in the memory 320 differs from that of the captured picture including the infrared image input from the camera module 310, so that the image processor 362 of the self-moving robot 300 detects the infrared light based on the difference.

If the image processor 362 detects no infrared light through the comparison between the previous and input pictures, the self-moving robot 300 returns to step S150 to move to search for the charger 100. On the other hand, if the image processor 362 detects infrared light at step S170, the microprocessor 360 of the self-moving robot 300 calculates the position of the infrared image in the captured picture through the position calculator 363 (S180). For example, the position calculator 363 calculates the direction from the center of the captured picture to the center of the infrared image.

Thereafter, the microprocessor 360 of the self-moving robot 300 outputs a movement control signal to the motor drive unit 370 through the movement controller 364 to allow the calculated position of the infrared image to be located at the center of the picture input through the lens (S190).

Specifically, each time the self-moving robot 300 according to the present invention moves a specific distance, the self-moving robot 300 compares image information of a previous picture stored in the memory 320 with image information of a current picture input from the camera module 310, and outputs a movement control signal for the self-moving robot 300 to the motor drive unit 370 through the movement controller 361, based on infrared light position information obtained by the comparison, to allow the infrared light to be located at the center of the picture.

As is apparent from the above description, in a system and method for automatically returning a self-moving robot to a charger according to the present invention, the position of the charger is detected based on infrared light image information input from a camera module provided on the self-moving robot, without using a separately mounted infrared or ultrasonic sensor that has been conventionally used for returning the self-moving robot to the charger. This allows the self-moving robot to more quickly return to the charger.

The system according to the present invention utilizes the fact that general camera modules mounted on self-moving robots can detect infrared light. The general camera module can easily detect infrared light emitted from the charger even when the charger is distant since the general camera module has a wide light receiving range (i.e., a wide image capturing range of images input to the camera module through the lens), compared to infrared or ultrasonic sensors which have been conventionally used for automatically returning the self-moving robot to the charger.

When any part of infrared light is detected in a captured picture input from the camera module, movement of the self-moving robot is controlled based on the position of the infrared light in the captured picture, so that the self-moving robot can more quickly return to the charger.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A system for automatically returning a self-moving robot to a charger, the system comprising:
    the charger, including an infrared module, for emitting infrared light in response to a charging request signal received from the self-moving robot through a wireless transceiver and outputting an infrared emission signal according to the emission of the infrared light; and
    the self-moving robot for outputting the charging request signal to the charger when a battery voltage of the self-moving robot is lower than a reference voltage and moving back to the charger using image information input from a camera module in response to the infrared emission signal received from the charger, the self-moving robot including a microprocessor for controlling movement of the self-moving robot to return the self-moving robot to the charger, using position information of infrared light in a picture input from the camera module, if the infrared light is detected in the picture input from the camera module.

2. The system according to claim 1, wherein the microprocessor includes:
a charging controller for outputting the charging request signal to the charger through the wireless transceiver when the battery voltage of the self-moving robot is lower than the reference voltage and controlling movement of the self-moving robot for searching for the charger in response to the infrared emission signal received from the charger;
an image processor for storing pictures input from the camera module in a memory and comparing image information of a previous picture stored in the memory with image information of a picture input from the camera module to detect infrared light emitted from the infrared module of the charger;
a position calculator for obtaining information of a position of infrared light in the picture input from the camera module when the image processor detects the infrared light; and
a movement controller for outputting a movement control signal based on the infrared light position information input from the position calculator to allow the position of the infrared light to be located at the center of the picture input from the camera.

3. The system according to claim 2, wherein the image information of the previous picture stored in the memory and the image information of the picture input from the camera module includes color or luminance information thereof.

4. The system according to claim 2, wherein wireless data communication between the charger and the self-moving robot is performed using one of a Bluetooth module, a wireless LAN module, and a Zigbee module.

5. The system according to claim 2, wherein data communication between the charger and the self-moving robot is performed using infrared light.

6. A system for automatically returning a self-moving robot to a charger, the system comprising:
the charger that is capable of communicating data with the self-moving robot and emits an infrared signal; and
the self-moving robot that is capable of communicating data with the charger, receives image information from the outside, compares previously stored image information with input image information, and calculates a position of the charger, from which infrared light is emitted, and returns to the charger when an infrared signal is detected from the input image information.

7. The system according to claim 6, wherein the charger includes:
a wireless transceiver for performing wireless data communication with the self-moving robot; and
an infrared module for driving a light emitting element to emit infrared light upon receiving a charging request signal from the self-moving robot through the wireless transceiver.

8. The system according to claim 7, wherein the self-moving robot includes:
a motor drive unit for controlling a drive motor to drive at least one wheel;
a battery meter for dividing a voltage applied to a battery by a specific resistance ratio, measuring the divided voltage, and outputting the measured level;
a wireless transceiver for performing wireless data communication with the charger;
a camera module for capturing images received from the outside;
a memory for storing an operating program for operation of the self-moving robot and image information input from the camera module; and
a microprocessor for controlling operations of the self-moving robot to control charging of the battery, control wireless data communication with the charger, process input images, calculate a position of the charger, and control movement of the self-moving robot.

9. The system according to claim 8, wherein the microprocessor includes:
a charging controller for generating and outputting a charging request signal to request that the battery be charged when the measured level input from the battery meter is lower than a reference level;
an image processor for storing image information input from the camera module in the memory and comparing previously stored image information with input image information to detect whether or not an infrared signal is present, and outputting the detection;
a position calculator for calculating an infrared light emission position from image information when the image processor detects that an infrared signal is included in the image information and outputting infrared light position information; and
a movement controller for outputting a control signal to the motor drive unit based on the position information output from the position calculator so that the self-moving robot returns to the charger.

10. The system according to claim 9, wherein the image processor detects whether or not an infrared signal is present based on the difference between color or luminance information of the previously stored image information and color or luminance information of the image information input from the camera module.

11. The system according to claim 9, wherein the position calculator calculates a direction from the center of a captured picture in which an infrared image is detected to the center of the infrared image.

12. The system according to claim 9, wherein the movement controller outputs a movement control signal using infrared light position information input from the position calculator to allow the position of infrared light in a captured picture to be located at the center of the captured picture.

13. The system according to claim 9, wherein the microprocessor transmits a charging request signal to the charger through the wireless transceiver in response to the charging request signal from the charging controller and outputs a movement control signal for searching for the charger to the movement controller upon receiving an infrared emission signal from the charger.

14. The system according to claim 13, wherein the movement controller allows the self-moving robot to move within a specific area to search for the charger according to a movement algorithm stored in the memory upon receiving the movement control signal for searching for the charger.

15. The system according to claim 8, wherein the camera module is located at the same height as a light emitting element of the infrared module.

16. The system according to claim 8, wherein wireless data communication between the charger and the self-moving robot is performed using one of a Bluetooth module, a wireless LAN module, and a Zigbee module.

17. The system according to claim 8, wherein wireless data communication between the charger and the self-moving robot is performed using infrared light.

18. A method for automatically returning a self-moving robot to a charger, the method comprising:
- transmitting a charging request signal to the charger when a measure battery level is lower than a reference voltage level;
- initiating movement of the self-moving robot to search for the charger and storing image information input through a camera module in response to an infrared emission signal from the charger;
- detecting infrared light emitted from the charger in the image information input through the camera module; and
- calculating a position of infrared light from the image information when the infrared light is detected in the image information and outputting a movement control signal to allow the self-moving robot to return to the charger.

19. The method according to claim 18, wherein detecting the infrared light includes comparing color or luminance information of previously stored image information with color or luminance information of image information input from the camera module to detect whether or not an infrared signal is present.

20. The method according to claim 18, wherein outputting the movement control signal to allow the self-moving robot to return to the charger includes:
- outputting a movement control signal using input infrared light position information to allow the position of infrared light in a captured picture to be located at the center of the captured picture.

* * * * *